United States Patent
Janzen et al.

(10) Patent No.: US 10,721,853 B2
(45) Date of Patent: Jul. 28, 2020

(54) CARBIDE CLAD HARROW TINE

(71) Applicant: Morris Industries Ltd., Saskatoon (CA)

(72) Inventors: Thomas Janzen, Yorkton (CA); Clint W. Sheppard, Yorkton (CA)

(73) Assignee: Morris Industries, Ltd. (CA)

( * ) Notice: Subject to any disclaimer, the term of this patent is extended or adjusted under 35 U.S.C. 154(b) by 0 days.

(21) Appl. No.: 16/238,294

(22) Filed: Jan. 2, 2019

(65) Prior Publication Data

US 2019/0208693 A1 Jul. 11, 2019

Related U.S. Application Data

(60) Provisional application No. 62/614,161, filed on Jan. 5, 2018.

(51) Int. Cl.
*A01B 23/02* (2006.01)

(52) U.S. Cl.
CPC .................................. *A01B 23/02* (2013.01)

(58) Field of Classification Search
CPC ............................... A01B 23/02; A01B 19/02
USPC ........................................ 172/707, 708, 745
See application file for complete search history.

(56) References Cited

U.S. PATENT DOCUMENTS

| | | | | |
|---|---|---|---|---|
| 1,960,879 A | * | 5/1934 | Russell et al. ......... | A01B 15/04 172/713 |
| 1,965,950 A | * | 7/1934 | Walker ................... | A01B 23/02 172/713 |
| 5,813,475 A | * | 9/1998 | Bergan et al. ......... | A01B 15/02 172/719 |
| 6,425,446 B1 | * | 7/2002 | Gates ..................... | A01B 23/02 172/707 |
| 7,677,843 B2 | * | 3/2010 | Techel et al. .......... | A01F 29/09 407/113 |
| 9,282,687 B2 | * | 3/2016 | Arksey et al. ......... | A01B 23/02 |
| 9,596,797 B2 | * | 3/2017 | Arksey et al. ......... | A01B 23/02 |
| 2016/0032559 A1 | * | 2/2016 | Congdon et al. ..... | E02F 3/8152 172/701.3 |

* cited by examiner

*Primary Examiner* — Thomas B Will
*Assistant Examiner* — Joel F. Mitchell
(74) *Attorney, Agent, or Firm* — Hovey Williams LLP

(57) ABSTRACT

An agricultural harrow includes a harrow tine configured to be advanced through the soil in a forward direction. The harrow tine broadly includes an elongated tine element and a laser deposited metallic wear material. The tine element presents a lower end configured to penetrate the soil as the tine is advanced. The tine element also presents an exterior element surface. The wear material is on the exterior element surface adjacent the lower end of the tine element.

13 Claims, 8 Drawing Sheets

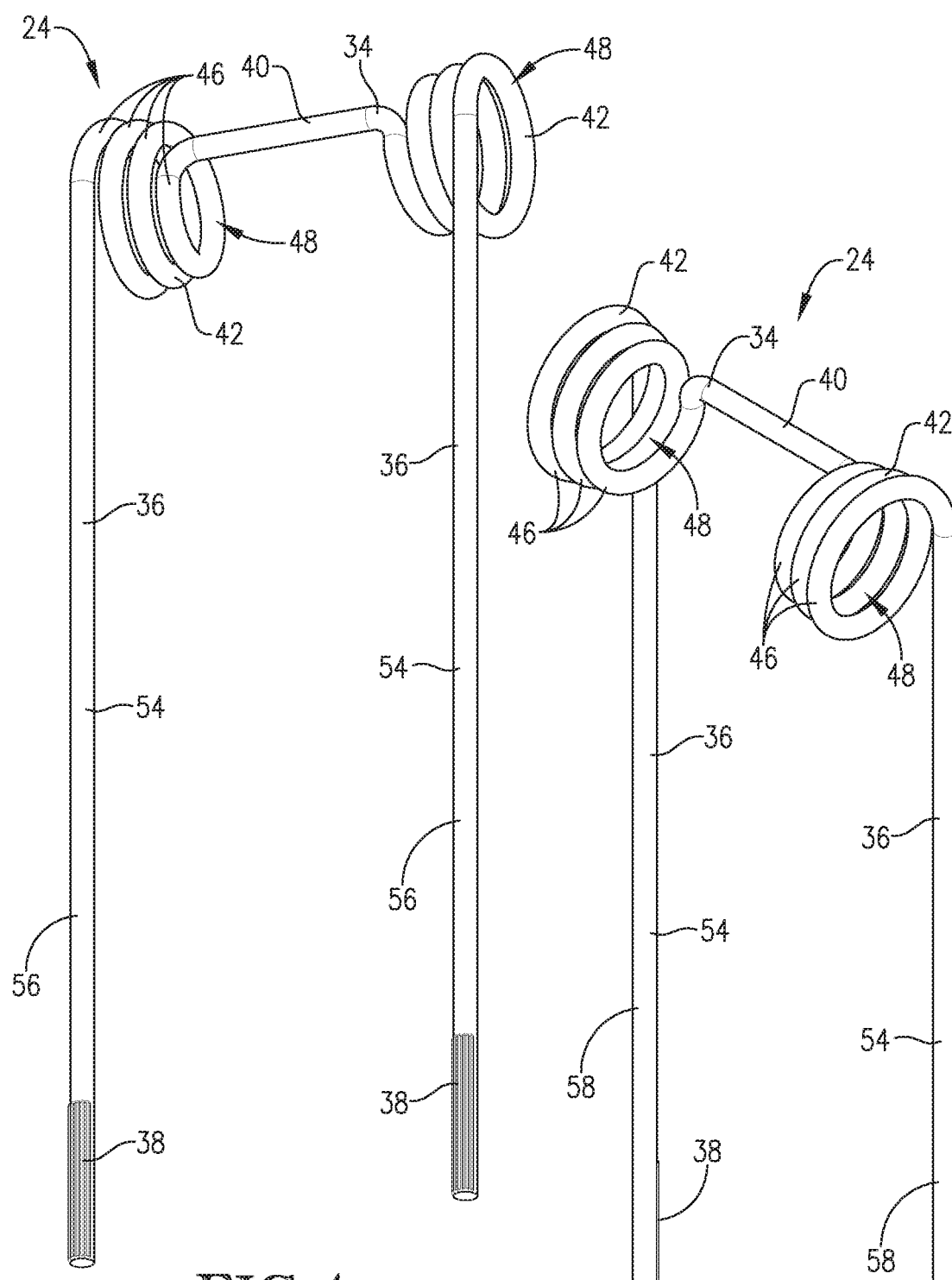

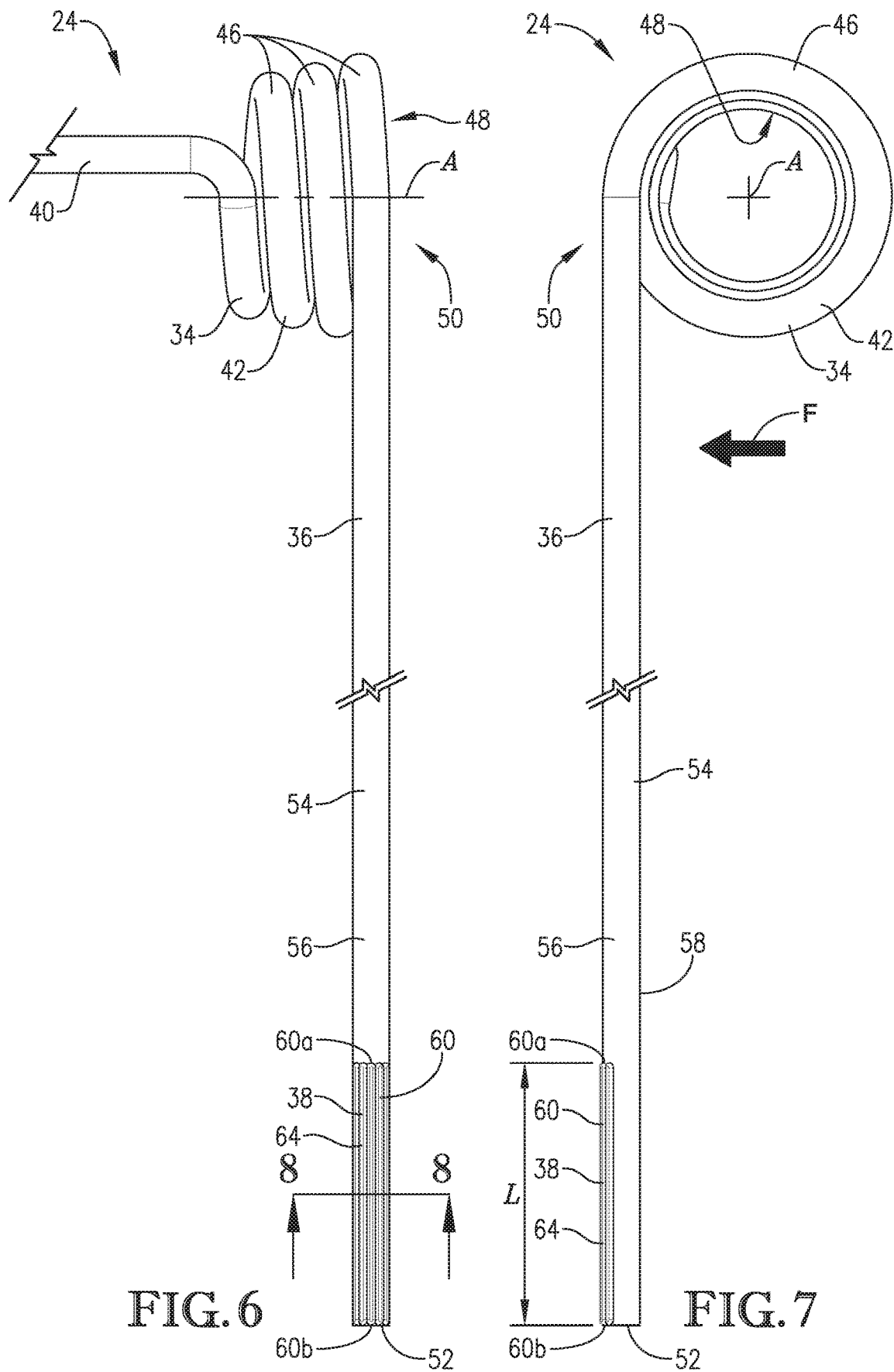

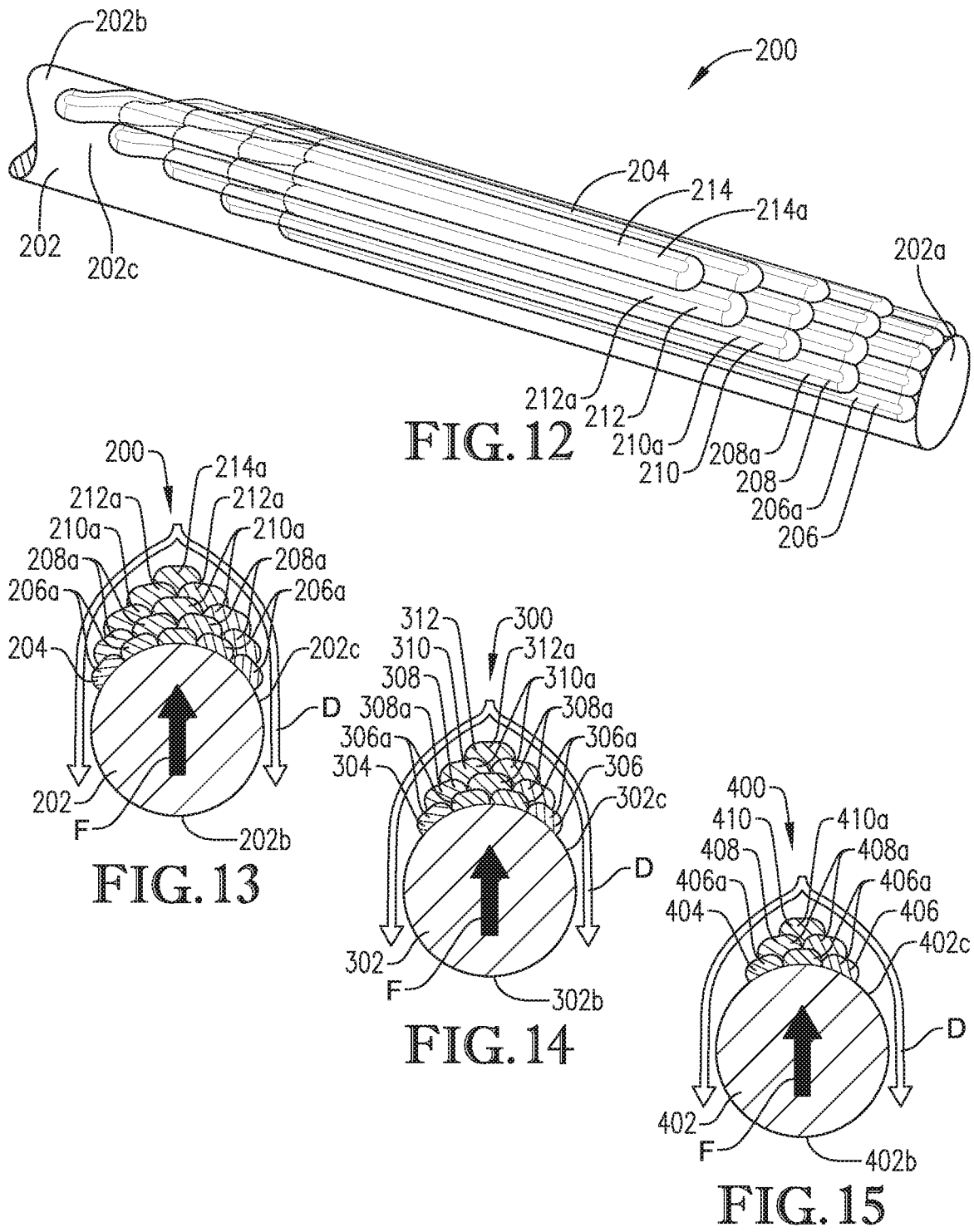

US 10,721,853 B2

1

CARBIDE CLAD HARROW TINE

RELATED APPLICATION

This application claims the benefit of U.S. Provisional Application Ser. No. 62/614,161, filed Jan. 5, 2018, entitled CARBIDE CLAD HARROW TINE, which is hereby incorporated in its entirety by reference herein.

BACKGROUND

1. Field

The present invention relates generally to agricultural implements. More specifically, embodiments of the present invention concern tillage tools that are reinforced by a wear tablet.

2. Discussion of Prior Art

Agricultural harrows are desirable for seedbed preparation prior to planting a new crop. Harrows traditionally include a plurality of spring-loaded harrow tines that are spaced apart from one another and depend from the harrow frame. Conventional harrow tines have tine elements supported by spring coils, and the tine elements are known to experience substantial wear due to continuous engagement with the soil. In general, prior art tine elements wear out well before the spring coil reaches the end of its fatigue life.

There have been a number of attempts to provide harrow tine elements with tungsten carbide in order to increase the wear resistance of the tine elements and thereby increase the useful life of the tine elements to a level similar to the spring coils. However, these conventional harrow tines are known to be exceedingly expensive and exhibit a useful life much greater than the life of the spring coils. Conventional harrow tines with tungsten carbide are also known to have a relatively rough finish and a somewhat unpredictable profile that causes residue to become caught on the tine. As a result, the harrow becomes relatively hard to set and causes poor residue spread, particularly in damp field conditions. Yet further, it is known that the tungsten carbide can become dislodged and flake off of the tine element.

SUMMARY

The following brief summary is provided to indicate the nature of the subject matter disclosed herein. While certain aspects of the present invention are described below, the summary is not intended to limit the scope of the present invention.

Embodiments of the present invention provide an agricultural harrow tine that does not suffer from the problems and limitations of the prior art harrow equipment, such as those set forth above.

A first aspect of the present invention concerns an agricultural harrow tine configured to be advanced through the soil in a forward direction. The harrow tine broadly includes an elongated tine element and a laser deposited metallic wear material. The tine element presents a lower end configured to penetrate the soil as the tine is advanced. The tine element also presents an exterior element surface. The wear material is on the exterior element surface adjacent the lower end of the tine element.

A second aspect of the present invention concerns a method of reinforcing an agricultural harrow tine, wherein the harrow tine includes an elongated tine element presenting a lower end configured to penetrate the soil as the tine is advanced in a forward direction. The method comprises the steps of providing a layer of metallic wear material on an exterior surface of the tine element adjacent the lower end thereof. The wear material provision step includes the step of laser deposition welding the metallic wear material on the exterior surface of the tine element.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 4 is a fragmentary front perspective of a harrow tine shown in FIGS. 1-3, showing a spring body, tine elements, and wear material of the harrow tine;

FIG. 5 is a fragmentary rear perspective of the harrow tine shown in FIG. 4;

FIG. 6 is an enlarged fragmentary front elevation of the harrow tine shown in FIGS. 4 and 5, showing an upper end of the tine element extending from a spring coil of the coil body, and further showing wear material applied to the tine element adjacent a lower end thereof, with the wear material including a plurality of longitudinal beads;

FIG. 7 is an enlarged fragmentary side elevation of the harrow tine shown in FIGS. 4-6;

FIG. 12 is a fragmentary perspective of a harrow tine constructed in accordance with a second preferred embodiment of the present invention, showing a tine element and five (5) wear material layers formed by a plurality of beads;

FIG. 13 is a fragmentary bottom view of the harrow tine shown in FIG. 12, showing the wear material layers applied to the leading face of the tine element;

Figure 1:
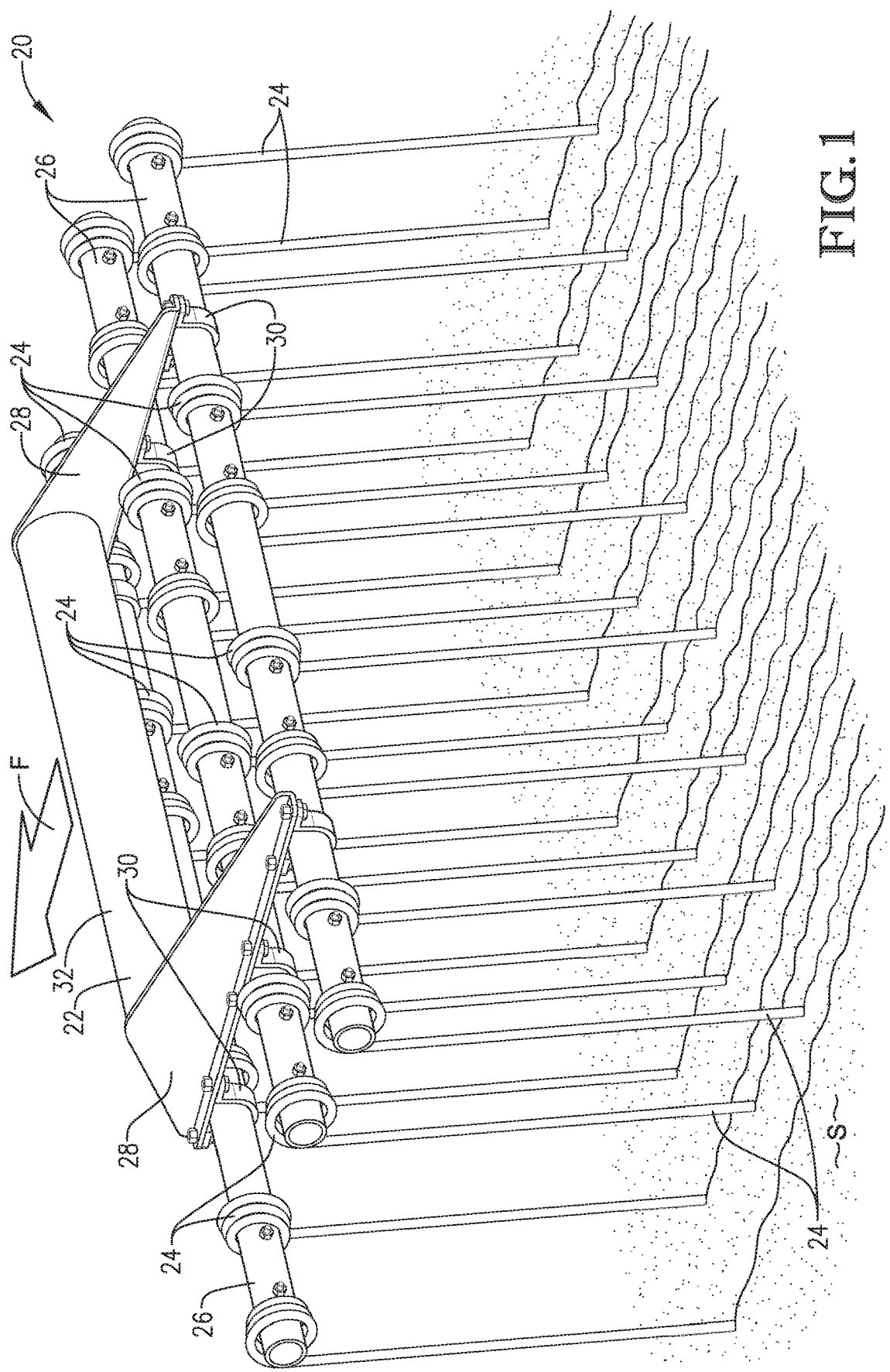
FIG. 1 is a rear perspective of an agricultural harrow constructed in accordance with a preferred embodiment of the present invention, showing the harrow being advanced through the soil to prepare a seedbed, and depicting a harrow frame and harrow tines of the harrow.

FIG. 14 is a fragmentary bottom view of a harrow tine constructed in accordance with a third preferred embodiment of the present invention, showing four (4) wear material layers applied to the leading face of a tine element; and FIG. 15 is a fragmentary bottom view of a harrow tine constructed in accordance with a fourth preferred embodiment of the present invention, showing three (3) wear material layers applied to the leading face of a tine element.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Figure 2:
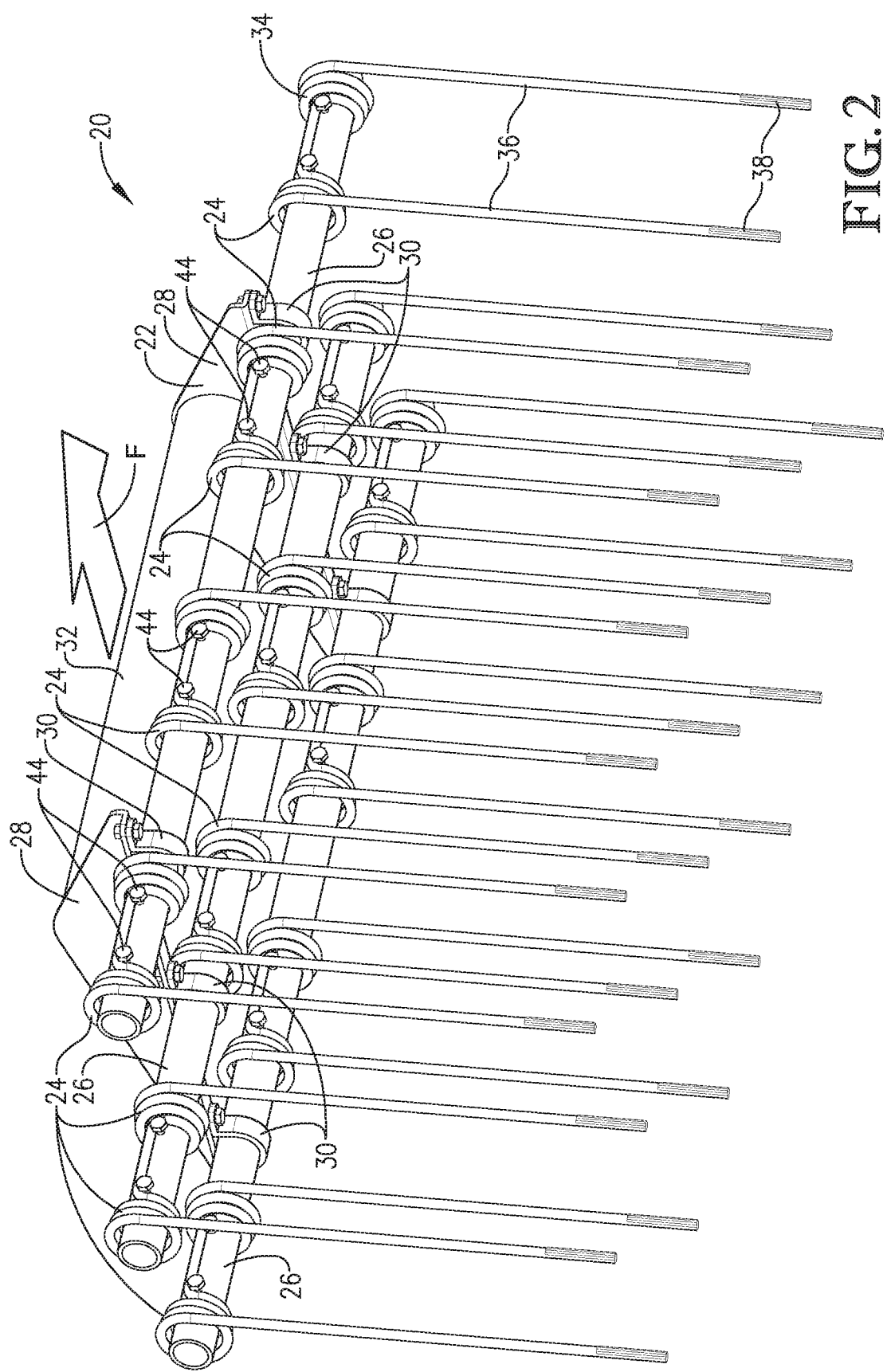
FIG. 2 is a front perspective of the agricultural harrow shown in FIG. 1, showing toolbars, angle brackets, U-shaped brackets, and an interconnecting bar of the harrow frame, and further showing the harrow tines mounted on respective toolbars.
Figure 3:
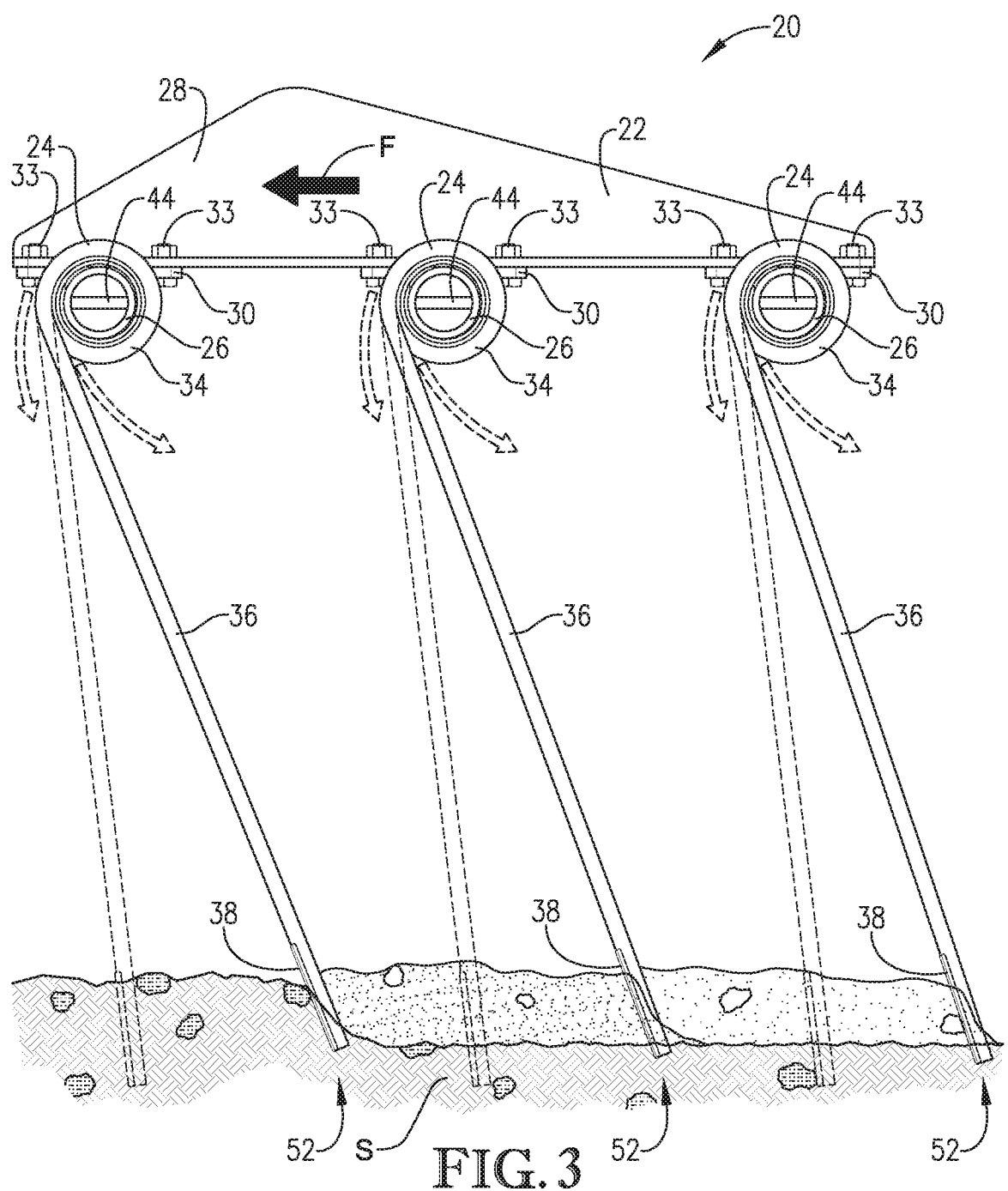
FIG. 3 is a side elevation of the agricultural harrow shown in FIGS. 1 and 2, showing the harrow tines penetrating the soil and being advanced through the soil.

Referring initially to FIGS. 1-3, an agricultural harrow 20 is constructed in accordance with a preferred embodiment of the present invention. In the usual manner, the harrow 20 is preferably configured to prepare a seedbed S for seeding. Preferably, the harrow 20 is operable to be vertically adjustably located relative to the seedbed S. With the harrow tines engaging the soil in an operating position, the harrow 20 is drawn behind a tractor (not shown) or another self-powered vehicle. The harrow 20 is preferably advanced through the soil in a forward direction F for preparation of the seedbed S. The harrow 20 preferably includes a harrow frame 22 and a plurality of harrow tines 24 mounted on the frame 22.

One of skill in the art will appreciate that the depicted harrow 20 can be provided as part of a variety of agricultural implements. For instance, multiple harrows 20 can be incorporated into a larger harrow implement used primarily for final seedbed preparation. The depicted harrow 20 is particularly effective for seedbed preparation that does not involve cultivating the soil.

However, it is also within the ambit of the present invention where the harrow 20 is used in combination with a cultivating implement. For example, multiple harrows 20 could be mounted along the back end of a cultivator (not shown). Again, one or more harrows 20 could be incorporated into other types of implements.

The harrow frame 22 is operable to support multiple rows of harrow tines 24 for tilling the soil. The illustrated frame 22 includes a series of toolbars 26, angle brackets 28, U-shaped brackets 30, and an interconnecting bar 32.

Each toolbar 26 comprises a unitary tube and extends laterally. However, the toolbar 26 could be alternatively constructed, sized and/or shaped consistent with the principles of the present invention. The toolbar 26 is preferably secured to the angle brackets 28 by corresponding U-shaped brackets 30 and threaded fasteners 33 (see FIG. 3).

The illustrated harrow frame 22 includes a series of toolbars 26 spaced apart from each other along the forward direction F and extending generally parallel to one another. It is entirely within the ambit of the present invention where the toolbars 26 are alternatively configured and/or positioned relative to one another to support the harrow tines 24. Yet further, the harrow frame 22 could include an alternative number of toolbars 26.

It will also be understood that other components of the harrow frame 22 (such as the angle brackets, U-shaped brackets, and/or the interconnecting bar) could be variously configured in accordance with certain aspects of the present invention.

In use, the harrow frame 22 is configured to yieldably support the harrow tines 24 as the harrow tines 24 are advanced through the soil in the forward direction F (see FIG. 3). The harrow frame 22 preferably supports the harrow tines 24 so that the harrow tines 24 can yieldably penetrate the soil while being advanced. The harrow frame 22 is constructed to mount the harrow 20 for advancement by a tractor or other self-powered vehicle. It will also be appreciated that the harrow frame 22 can be incorporated as part of a larger implement frame.

Turning to FIGS. 2-7, the harrow tines 24 are configured to be advanced through the soil for preparation of the seedbed S. The harrow tine 24 preferably includes a spring body 34, a pair of tine elements 36, and wear material 38 applied to the tine elements 36. The depicted harrow tine 24 is preferably configured and supported by the harrow frame 22 so that the tine elements 36 are positioned laterally alongside one another.

The spring body 34 is preferably formed (with the tine elements 36) from a metallic wire structure that is elongated and unitary. The spring body 34 is formed to define a central bight 40 and a pair of spring coils 42 on opposite lateral sides of the bight 40 (see FIGS. 4 and 5).

The bight 40 is operable to secure the harrow tine 24 to one of the toolbars 26. More specifically, the harrow 20 includes fasteners 44 that engage and connect the bight 40 to the corresponding toolbar 26 (see FIGS. 2 and 3). Although the configuration of the depicted bight 40 is preferred, the bight could be variously configured (e.g., for alternatively mounting the harrow tine), in accordance with certain aspects of the present invention.

In the usual manner, the spring body 34 (primarily the spring coils 42) is configured to yieldably urge the tine elements 36 to penetrate the soil when the harrow tine 24 is in the operating position. Each spring coil 42 includes a plurality of arcuate coil elements 46 arranged in series to cooperatively form a helical torsion spring (see FIGS. 4-6). The depicted coil elements 46 are wrapped around a lateral coil axis A to cooperatively form a coil opening 48 (see FIGS. 6 and 7). The spring coils 42 are preferably arranged so that the spring coils 42 of each harrow tine 24 are generally coaxial with each other. In use, the spring coils 42, along with other parts of the harrow tine 24, are configured to yieldably flex as the lower end 52 is advanced through the soil.

While the spring coils 42 have a preferred construction, it will be understood that the spring coils could be alternatively configured without departing from the scope of certain aspects of the present invention. The depicted spring coils 42 are formed of metallic wire having a generally circular profile. However, the spring coils could be formed of wire having an alternative wire profile size or shape, such as a polygonal profile (e.g., square, rectangular, hexagonal, etc.), a profile having curved surfaces (e.g., an oval or elliptical profile), or a profile having a combination of curved and flat surfaces. The spring coils could also present an alternative number of coil elements. In other alternative embodiments, the harrow tine could use spring elements other than spring coils to yieldably urge the tine elements to penetrate the soil.

The tine elements 36 each comprise an elongated and generally cylindrical body that is continuous along its length. Each tine element 36 presents upper and lower ends 50,52 and integrally extends from the respective spring coil 42 at the upper end 50 (see FIGS. 6 and 7). According to certain aspects of the present invention, one or both of the tine elements 36 could be separately formed and fixed or attached to the respective spring coils 42. The lower end 52 of the tine element 36 is configured to penetrate the soil as the harrow tine 24 is advanced in the forward direction F (see FIG. 3).

Figure 8:
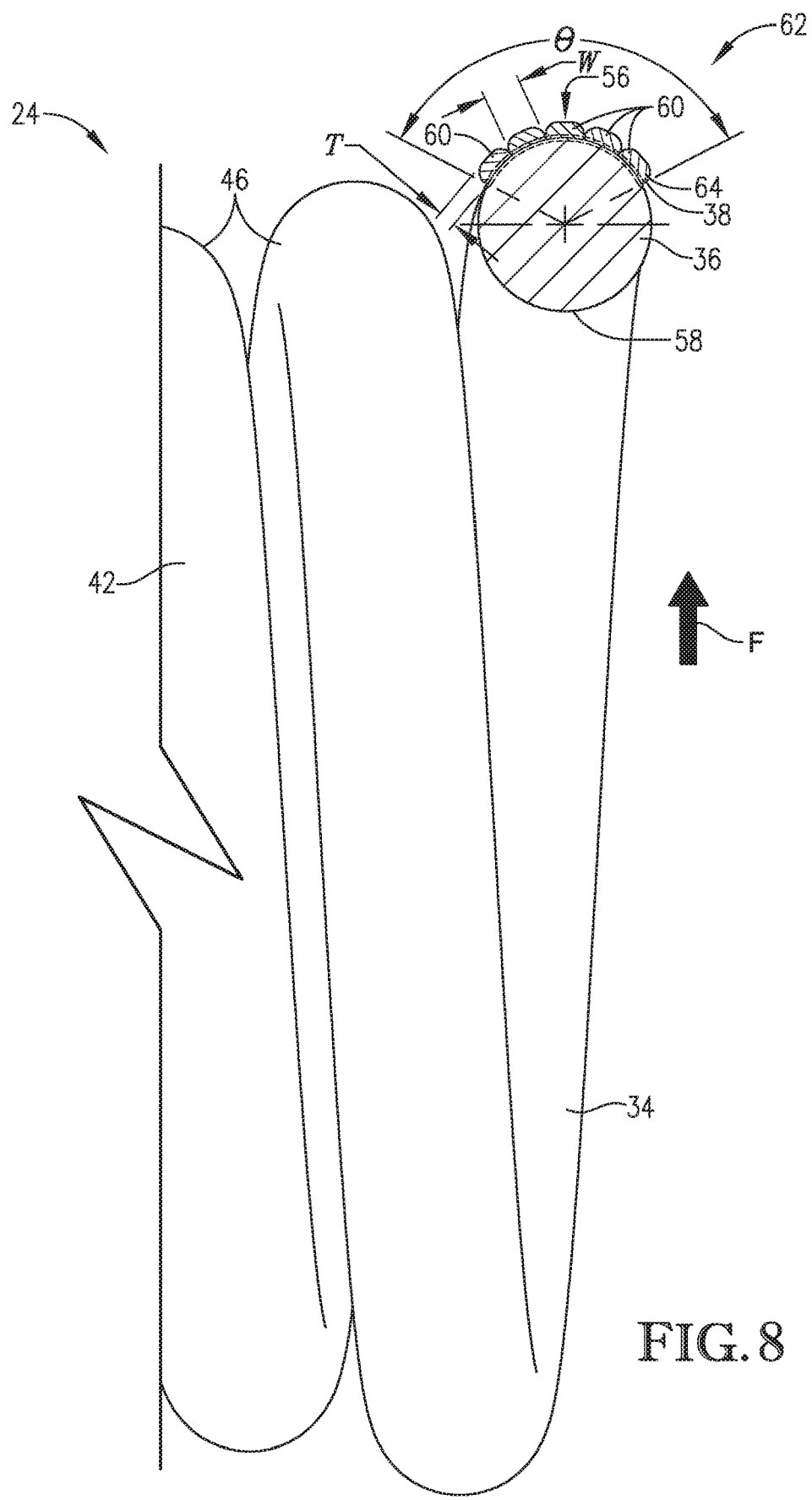
FIG. 8 is a greatly enlarged fragmentary cross-sectional view of the harrow tine taken along line 8-8 in FIG. 6, showing the longitudinal beads positioned circumferentially along a leading face of the tine element.
Figure 9:
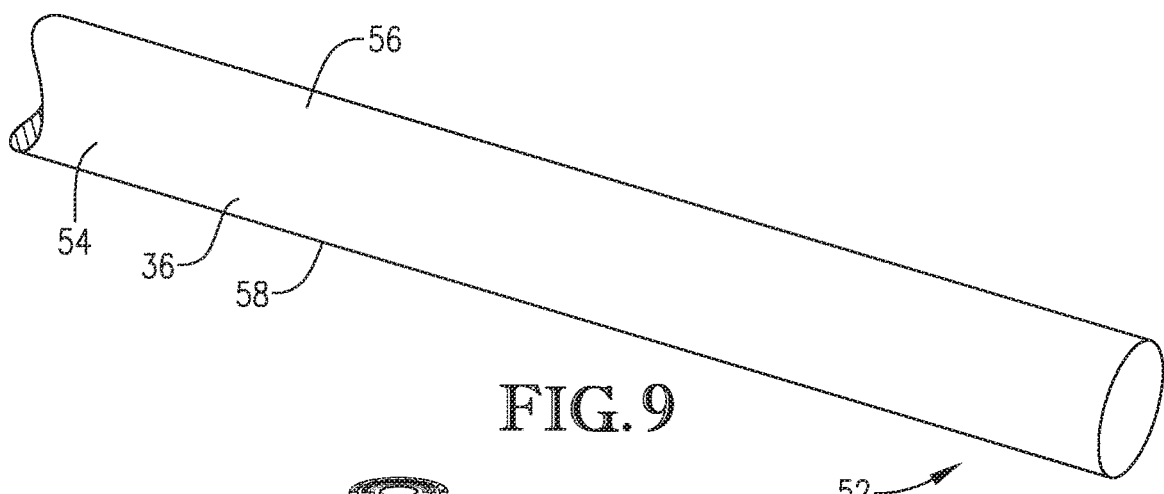
FIG. 9 is a fragmentary perspective of the harrow tine shown in FIGS. 4-8, showing the tine element prior to the beads being applied to the leading face by laser metal deposition.
Figure 10:
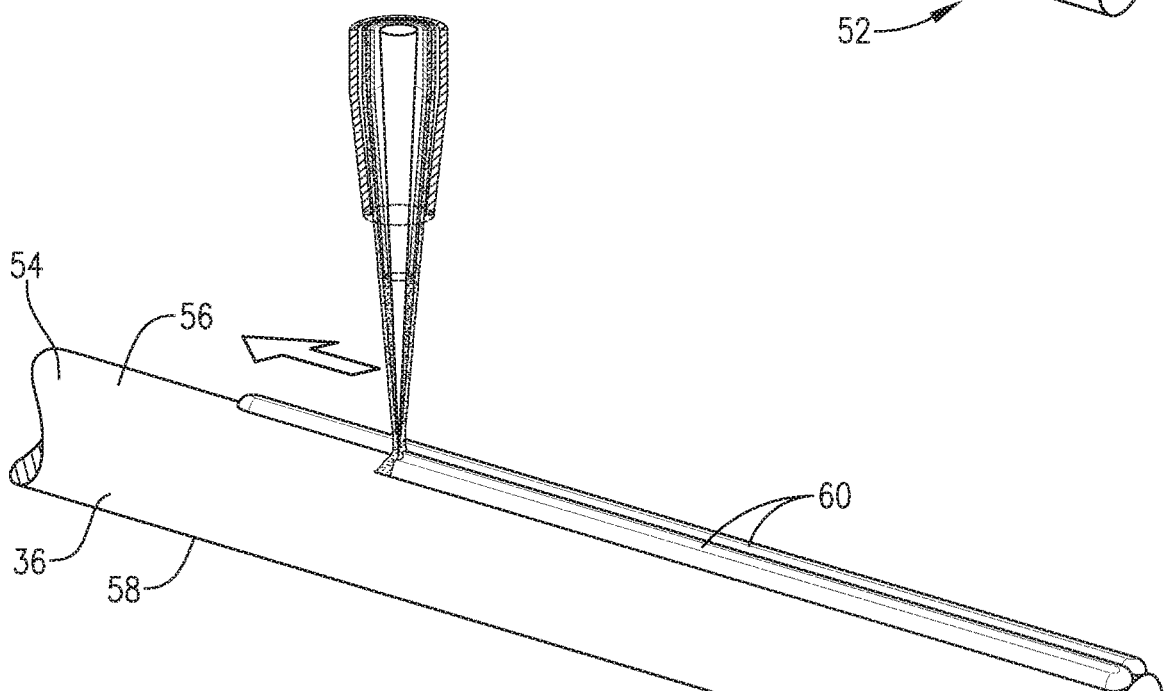
FIG. 10 is a fragmentary perspective of the harrow tine similar to FIG. 9, but showing the tine as beads are applied to the leading face by laser metal deposition.

The tine element 36 presents an exterior element surface 54 that is generally cylindrical and extends continuously between the upper and lower ends 50,52. The exterior element surface 54 of each tine element 36 preferably presents opposite leading and trailing faces 56,58 (see FIGS. 6 and 7). The leading and trailing faces 56,58 are oriented relative to the forward direction F along which the harrow tine 24 is advanced. In the depicted embodiment, the leading and trailing faces 56,58 each extend along half of the circumference of the exterior element surface 54 (see FIG. 8).

As will be discussed, each tine element 36 has wear material 38 applied to the exterior element surface 54 adjacent to the lower end 52 to provide the harrow tine 24 with wear resistance.

The depicted tine elements 36 are formed of metallic wire having a generally circular profile. However, in accordance with certain aspects of the present invention, the tine elements could be formed of wire having an alternative wire profile size or shape, such as a polygonal profile (e.g., square, rectangular, hexagonal, etc.), a profile having curved surfaces (e.g., an oval or elliptical profile), or a profile having a combination of curved and flat surfaces.

Again, the illustrated spring body 34 and tine elements 36 are formed from a common, unitary piece of a metallic wire. However, for certain aspects of the invention, the tine elements could be formed separately from the spring body. Furthermore, the tine elements could be alternatively coupled to the spring coil. For example, the tine element could be removably attached to the spring coil using a fastening structure.

The depicted harrow tine 22 preferably includes a pair of tine elements 36 positioned laterally alongside one another. For some aspects of the present invention, the harrow tine could have an alternative number of springs and tine elements. For instance, the harrow tine could have a single spring and tine element. In other alternative embodiments, the harrow tine could include more than two springs and more than two tine elements.

Each toolbar 26 preferably supports a series of laterally spaced harrow tines 22. In the depicted embodiment, each harrow tine 22 is positioned so that the toolbar 26 extends through the coil openings 48. Furthermore, the tine elements 36 hang below the spring coils 42, with the upper end 50 of each tine element 36 positioned generally in front of the corresponding toolbar 26. The harrow tines 22 are secured by fasteners 44 that extend through the toolbars 26 and engage the bight 40 of the harrow tine 22.

By positioning the tine elements 36 with the upper end 50 generally in front of the toolbar 26, the spring body 34 of the harrow tine 22 is operable to yieldably urge the tine elements 36 into contact with the soil and the lower end 52 is configured to yieldably penetrate the soil as the harrow 20 is advanced in the forward direction F.

The illustrated positioning of the harrow tine 22 relative to the toolbar 26 is preferred, although the harrow tine could be alternatively positioned without departing from the ambit of the present invention.

Turning to FIGS. 6-11, the wear material 38 preferably comprises a laser deposited metallic wear material operable to reinforce the exterior element surface 54 of the tine element 36. It will be understood that the wear material 38 reinforces the harrow tine 24 and thereby minimizes tine wear as the harrow tine 24 is advanced through the soil in the forward direction F.

In the depicted embodiment, the wear material 38 includes a plurality of longitudinal beads 60 (see FIGS. 8-11). Each bead 60 preferably extends lengthwise along the leading face 56 of the exterior element surface 54. The bead 60 presents a bead width dimension W and a radial thickness dimension T (see FIG. 8). The width dimension W preferably ranges from about one millimeter (1 mm) to about five millimeters (5 mm) and, more preferably is about three millimeters (3 mm).

Figure 11:
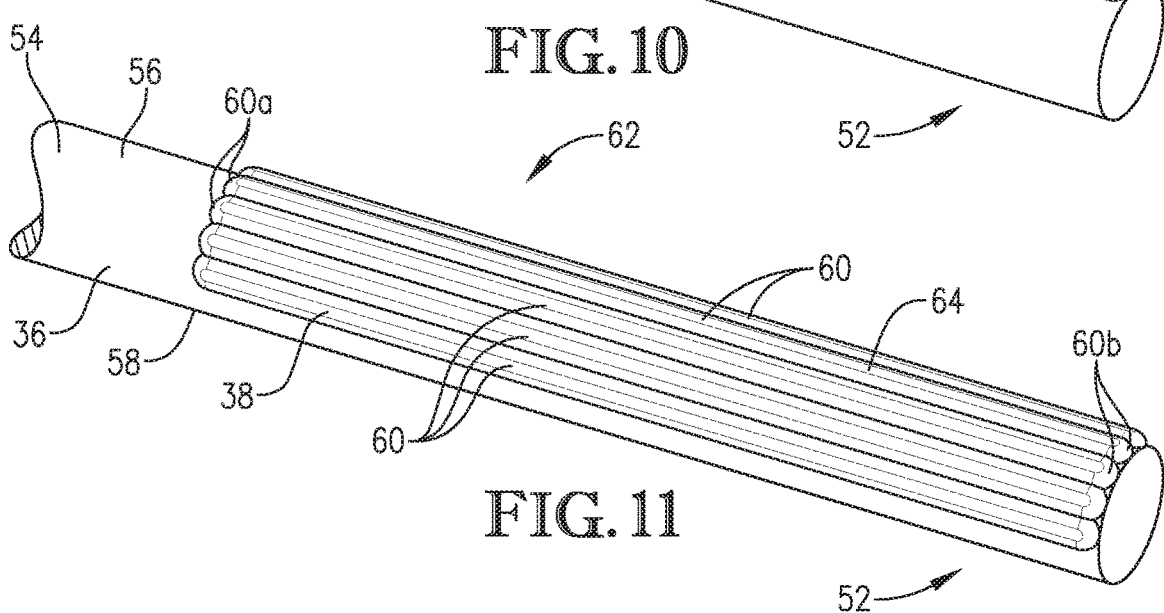
FIG. 11 is a fragmentary perspective of the harrow tine similar to FIG. 10, but showing all of the beads applied to the leading face.

The bead 60 also presents upper and lower bead ends 60a,b that define a bead length L (see FIGS. 7 and 11). The bead length L preferably ranges from about one inch (1") to about six inches (6") and, more preferably, is about four inches (4"). However, with respect to certain aspects of the present invention, the bead length L could fall outside the preferred range.

The wear material 38 preferably includes a tungsten carbide material. Although tungsten carbide is desirable for its wear-resistant properties, it is also within the ambit of certain aspects of the present invention for an alternative wear-resistant material to be applied to the tine element.

The depicted beads 60 with tungsten carbide are preferably formed using a laser metal deposition (LMD) process (also referred to as laser deposition welding). The LMD process involves forming a melt pool in the substrate provided by the tine element 36 and supplying a fine-grain tungsten carbide powder adjacent the melt pool (see FIG. 10).

The powder preferably comprises a spherical-grain tungsten carbide suspended in a nickel matrix. The powder preferably has a ratio of about sixty percent (60%) by weight of tungsten carbide to about forty percent (40%) by weight of a nickel matrix, although different ratios could be employed in accordance with some aspects of the present invention.

The powder also preferably has a powder grain diameter than ranges from about fifty microns (50 μm) to about one hundred eighty microns (180 μm). For some aspects of the present invention, the powder grain size could fall outside of this range.

According to certain aspects of the present invention, one or more of the beads 60 could be alternatively oriented relative to the exterior element surface 54. For instance, one or more beads could be arranged in a direction other than a lengthwise direction (e.g., where one or more beads are applied circumferentially along the exterior element surface).

The longitudinal beads 60 are preferably arranged side-by-side so that each adjacent pair of beads 60 are generally parallel and contact one another along substantially their entire length. Preferably, the side-by-side beads 60 cooperatively cover an arcuate portion 62 of the leading face 56 of the exterior element surface 54 (see FIG. 8). It is also within the scope of certain aspects of the present invention where one or more beads cover an arcuate portion of the trailing face 58 of the exterior element surface 54. For example, multiple beads could be arranged to extend along the entire circumference of the leading face and along part of the circumference of the trailing face.

The arcuate portion 62 preferably defines a circumferential angle θ (see FIG. 8) of at least ninety degrees (90°). In certain preferred embodiments, the circumferential angle θ ranges from about seventy degrees (70°) to about one hundred eighty degrees (180°). More preferably, the circumferential angle θ ranges from about ninety degrees (90°) to about one hundred thirty degrees (130°). However, for some aspects of the present invention, the circumferential angle θ could fall outside these ranges. For instance, where the beads extend along the leading face and the trailing face, the circumferential angle θ could be greater than one hundred eighty degrees (180°).

The side-by-side beads 60 cooperatively form a continuous layer 64 of wear material 38. Again, adjacent pairs of beads 60 preferably contact one another along substantially their entire length. However, it is within the scope of some aspects of the present invention for adjacent beads to not contact each other along their entire length. For example, adjacent beads may have different lengths and/or the adjacent beads may be longitudinally offset or circumferentially spaced from one another.

In certain alternative embodiments, it will be understood that at least one pair of adjacent beads may be spaced apart so as not to contact one another along their length. For instance, another wear material could be positioned between such adjacent beads so that the beads are spaced apart.

The depicted layer preferably includes five (5) beads 60 located side-by-side. However, the layer 64 could include a smaller or larger number of beads consistent with the principles of the present invention. It will be appreciated that the number of beads could be selected based upon various factors, such as the desired circumferential angle θ, the width of the beads, and/or the bead profile shape.

Although the depicted beads 60 form a single layer 64 of wear material 38, it will be understood that the wear material could be formed by multiple layers of beads that overlie one another. As will be shown in alternative embodiments below, it is within the ambit of the present invention to provide alternative numbers of layers.

In use, the harrow tines 24 present lower ends 52 configured to penetrate the soil as the harrow tines 24 are advanced in the forward direction. The harrow tine 24 is positioned and secured to the toolbar 26 to yieldably penetrate the seedbed S so that the wear material 38 generally faces forwardly to engage the soil. More specifically, the spring coils 42 (and other parts of the harrow tine 24) are configured to yieldably flex as the lower ends 52 are advanced through the soil in the forward direction F.

Turning to FIGS. 12-15, alternative preferred embodiments of the present invention are depicted. For the sake of brevity, the remaining description will focus primarily on the differences of these alternative embodiments from the preferred embodiment described above.

Initially referring to FIGS. 12 and 13, an alternative harrow tine 200 is constructed in accordance with a second embodiment of the present invention. The harrow tine 200 includes a spring body (not shown), tine elements 202, and an alternative wear material 204.

The tine element 202 is elongated and presents a lower end 202a and an exterior element surface 202b with a leading face 202c.

The wear material 204 preferably includes a series of layers 206,208,210,212,214 that overlie one another. The depicted layers 206,208,210,212,214 are defined by respective beads 206a,208a,210a,212a,214a. The layer 206 is the radially innermost layer and is applied directly to the leading face 202c of the exterior element surface 202b. The layer 206 is positioned to extend longitudinally from the lower end 202a.

The layers 206,208,210,212 have adjacent pairs of beads arranged side-by-side and in contact with one another along their length. The depicted radially innermost layer 206 preferably has the largest number of beads. Each progressively radially outer layer 208,210,212,214 has preferably one fewer bead than the adjacent radially inward layer. Thus, the layer 206 has five (5) beads 206a, the layer 208 has four (4) beads 208a, the layer 210 has three (3) beads 210a, the layer 212 has two (2) beads 212a, and the layer 214 comprises a single bead 214a. It will be appreciated that the depicted layer configuration will have a corresponding effect on the flow direction D of soil around the harrow tine.

As will be shown in subsequent embodiments the radially innermost layer could include either a larger number of beads or a smaller number of beads. Similarly, the radially outermost layer could have a larger number of beads. As the subsequent embodiments also illustrate, the wear material could be formed by an alternative number of layers.

For layers with progressively smaller numbers of beads, it will be understood that the reduction in beads between adjacent layers could be greater than one bead (e.g., where the adjacent radially outer layer has two (2) or more fewer beads than the adjacent radially inner layer).

For certain aspects of the present invention, adjacent layers could have a radially outer layer with the same number of beads or more beads than the radially inner layer.

As shown in the illustrated embodiment, the layers 206, 208,210,212,214 are progressively longitudinally offset from each other. Again, the radially innermost layer 206 has beads 206a positioned to extend longitudinally from the lower end 202a. Each progressively radially outer layer 208,210,212,214 preferably has beads spaced further from the lower end 202a than the adjacent radially inward one of the layers. That is, each progressively radially outer layer presents lower bead ends spaced further from the lower end 202a than the adjacent radially inward one of the layers.

In accordance with certain aspects of the present invention, alternative spacing from the lower end among the bead layers (or no relative offset from the end, such that all the layers extend to the lower end or are equally spaced from the lower end) may be utilized.

Turning to FIGS. 13 and 14, alternative harrow tines 300 and 400 are provided in accordance with third and fourth embodiments, respectively, of the present invention and show alternative wear material configurations.

The harrow tine 300 includes tine element 302 and an alternative wear material 304. The tine element 302 is elongated and presents an exterior element surface 302b with a leading face 302c.

The wear material 304 preferably includes a series of layers 306,308,310,312 that overlie one another. The depicted layers 306,308,310,312 are defined by respective beads 306a,308a,310a,312a. The layer 306 is the radially innermost layer and is applied directly to the leading face 302c of the exterior element surface 302b. The layer 306 is positioned to extend longitudinally from the lower end (not shown).

The depicted radially innermost layer 306 preferably has four (4) beads 306a, the layer 308 has three (3) beads 308a, the layer 310 has two (2) beads 310a, and the layer 312 comprises a single bead 312a.

The harrow tine 400 includes tine element 402 and an alternative wear material 404. The tine element 402 is elongated and presents an exterior element surface 402b with a leading face 402c.

The wear material 404 preferably includes a series of layers 406,408,410 that overlie one another. The depicted layers 406,408,410 are defined by respective beads 406a, 408a,410a. The layer 406 is the radially innermost layer and is applied directly to the leading face 402c of the exterior element surface 402b. The layer 406 is positioned to extend longitudinally from the lower end (not shown).

The depicted radially innermost layer 406 preferably has three (3) beads 406a, the layer 408 has two (2) beads 408a, and the layer 410 comprises a single bead 410a.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An agricultural harrow tine configured to be advanced through the soil in a forward direction, said harrow tine comprising:
    an elongated tine element presenting a lower end, with the lower end being configured to penetrate the soil as the tine is advanced,
    said tine element presenting an exterior element surface; and
    a laser deposited metallic wear material on the exterior element surface adjacent the lower end of the tine element,
    said exterior element surface presenting opposite leading and trailing faces relative to the forward direction along which the harrow tine is advanced,
    said metallic wear material being located on the leading face,
    said metallic wear material comprising a longitudinal bead extending lengthwise along the leading face of the exterior element surface,
    said metallic wear material including a plurality of side-by-side beads cooperatively covering an arcuate portion of the leading face of the exterior element surface,
    said arcuate portion extending along an angle of at least ninety degrees,
    said metallic wear material including multiple layers of beads, with each progressively outer layer being spaced from the lower end further from an adjacent radially inward one of the layers.
2. The agricultural harrow tine as claimed in claim 1,
    said exterior element surface being cylindrical, with the leading and trailing faces each extending along half of the circumference of the exterior element surface.
3. The agricultural harrow tine as claimed in claim 1,
    said progressively outer layer having fewer beads than said adjacent radially inward one of the layers.
4. The agricultural harrow tine as claimed in claim 3,
    said beads of a radially innermost one of said layers extending to the lower end of the tine element.
5. The agricultural harrow tine as claimed in claim 1,
    said metallic wear material extending to the lower end of the tine element.
6. The agricultural harrow tine as claimed in claim 1, further comprising:
    a spring coil,
    said tine element being coupled to the spring coil, such that the lower end of the tine element is configured to yieldably penetrate the soil.
7. A method of reinforcing an agricultural harrow tine, wherein the harrow tine includes an elongated tine element presenting a lower end configured to penetrate the soil as the tine is advanced in a forward direction, said method comprising the steps of:
    (a) providing a layer of metallic wear material on an exterior surface of the tine element adjacent the lower end thereof,
    step (a) including the step of laser deposition welding the metallic wear material on the exterior surface of the tine element,
    step (a) including the step of positioning the metallic wear material on a leading face of the exterior element surface relative to a forward direction along which the harrow tine is advanced,
    step (a) including the step of forming a plurality of longitudinal beads in a side-by-side relationship so as to cooperatively cover a portion of the leading face of the exterior element surface,
    step (a) including the step of forming multiple layers of beads.
8. The method as claimed in claim 7,
    said laser deposition welding step including the steps of forming a heated melt pool along the exterior surface of the tine element and directing a wear material powder adjacent the melt pool to form the metallic wear material.
9. The method as claimed in claim 7,
    step (a) including the step of forming a longitudinal bead that extends lengthwise along the leading face of the exterior element surface.
10. The method as claimed in claim 7,
    said step of forming multiple layers of beads including the step of spacing each progressively outer layer further from the lower end than an adjacent radially inward one of the layers.
11. The method as claimed in claim 10,
    said step of forming multiple layers of beads including the step of providing fewer beads in each progressively outer layer than the adjacent radially inward one of the layers.
12. The method as claimed in claim 11,
    said step of forming multiple layers of beads including the step of extending a radially innermost one of said layers to the lower end of the exterior element surface.
13. A method of reinforcing an agricultural harrow tine, wherein the harrow tine includes an elongated tine element presenting a lower end configured to penetrate the soil as the tine is advanced in a forward direction, said method comprising the steps of:
    (a) providing a layer of metallic wear material on an exterior surface of the tine element adjacent the lower end thereof,
    step (a) including the step of laser deposition welding the metallic wear material on the exterior surface of the tine element, step (a) including the step of positioning the metallic wear material on a leading face of the exterior element surface relative to a forward direction along which the harrow tine is advanced, step (a) including the step of forming a plurality of longitudinal beads in a side-by-side relationship so as to cooperatively cover a portion of the leading face of the exterior element surface, said exterior element surface being cylindrical, with the leading and trailing faces each extending along half of the circumference of the exterior element surface, said step of forming a plurality of longitudinal beads including the step of covering at least a ninety degree arcuate portion of the leading face.

\* \* \* \* \*